(12) United States Patent
Faigle et al.

(10) Patent No.: US 6,357,791 B1
(45) Date of Patent: Mar. 19, 2002

(54) AIR BAG MODULE WITH VENT

(75) Inventors: Ernst M. Faigle, Dryden, MI (US); Alexander Heilig, Waldstetten (DE)

(73) Assignees: TRW Occupant Restraint Systems GmbH & Co. KG, Alfdorf (DE); TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/599,192

(22) Filed: Jun. 22, 2000

(51) Int. Cl.[7] .............................................. B60R 21/26
(52) U.S. Cl. ...................................... 280/736; 280/739
(58) Field of Search ................................ 280/736, 739, 280/742, 735

(56) References Cited

U.S. PATENT DOCUMENTS

| | | | |
|---|---|---|---|
| 3,861,712 A | * 1/1975 | Matsui et al. | 280/739 |
| 5,366,242 A | * 11/1994 | Faigle et al. | 280/736 |
| 5,695,214 A | 12/1997 | Faigle et al. | |
| 5,707,078 A | * 1/1998 | Swanberg et al. | 280/736 |
| 5,709,405 A | 1/1998 | Saderholm et al. | |
| 5,853,192 A | * 12/1998 | Sikorski et al. | 280/739 |
| 5,918,901 A | 7/1999 | Johnson et al. | |

* cited by examiner

Primary Examiner—Peter C. English
(74) Attorney, Agent, or Firm—Tarolli, Sundheim, Covell, Tummino & Szabo L.L.P.

(57) ABSTRACT

A vehicle occupant protection apparatus (10) includes an inflatable vehicle occupant protection device (16) having a deflated condition and an inflated condition for helping to protect the vehicle occupant. An inflation fluid source (18) is actuatable to provide inflation fluid to inflate the inflatable device (16). A housing (14) directs inflation fluid under pressure from the inflation fluid source (18) toward the inflatable device (16) upon actuation of the inflation fluid source (18). The housing (14) has an opening (38) for enabling flow of inflation fluid out of the housing (14) and away from the inflatable device (16). A door (82) is movable between a closed condition closing the opening (38) and an open condition enabling flow of inflation fluid out of the housing (14) through the opening (38). An energizable mechanism (100) retains the door (82) in the closed condition and, when energized, enables movement of the door (82) from the closed condition to the open condition in response to fluid pressure in the housing (14). The energizable mechanism (100) comprises an electromagnet (106).

8 Claims, 2 Drawing Sheets

AIR BAG MODULE WITH VENT

BACKGROUND OF THE INVENTION

1. Technical Field

The present invention relates to a vehicle occupant protection apparatus including an inflatable vehicle occupant protection device, such as an air bag. In particular, the present invention relates to an air bag module in which inflation fluid is selectively vented from a housing of the module in order to control the speed and force of deployment of the air bag.

2. Description of the Prior Art

It is known to inflate an air bag to help protect a vehicle occupant in the event of sudden deceleration such as occurs in a vehicle collision. The air bag is stored in a deflated condition, together with an inflator, in a housing adjacent to the vehicle seat in which the occupant sits. The inflator, when actuated, provides a large volume of inflation fluid to inflate the air bag into a position to help protect the vehicle occupant.

Under normal circumstances, substantially all of the inflation fluid from the inflator is directed into the air bag to inflate the air bag. In some circumstances, however, it may be desirable to control or limit the amount of inflation fluid directed into the air bag. For example, if the vehicle occupant is smaller than a predetermined size or is closer to the vehicle instrument panel than a predetermined distance, then it may be desirable to reduce the speed and force with which the air bag inflates. It is known to vent inflation fluid from the housing of an air bag module in such circumstances, so that less inflation fluid is directed into the air bag.

SUMMARY OF THE INVENTION

The present invention is a vehicle occupant protection apparatus. The apparatus includes an inflatable vehicle occupant protection device, an inflation fluid source, a housing, a door, and an energizable means. The inflatable vehicle occupant protection device has a deflated condition and an inflated condition for helping to protect the vehicle occupant. The inflation fluid source is actuatable to provide inflation fluid to inflate the inflatable device. The housing directs inflation fluid under pressure from the inflation fluid source toward the inflatable device upon actuation of the inflation fluid source. The housing further has an opening for enabling flow of inflation fluid out of the housing and away from the inflatable device. The door is movable between a closed condition closing the opening and an open condition enabling flow of inflation fluid out of the housing through the opening. The energizable means retains the door in the closed condition and, when energized, enables movement of the door from the closed condition to the open condition in response to fluid pressure in the housing. The energizable means comprises an electromagnet.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION OF AN EMBODIMENT OF THE INVENTION

The present invention relates to a vehicle occupant protection apparatus including an inflatable vehicle occupant protection device, such as an air bag. In particular, the present invention relates to an air bag module in which inflation fluid is selectively vented from a housing of the module in order to control the speed and force of deployment of the inflating air bag.

Figure 1:
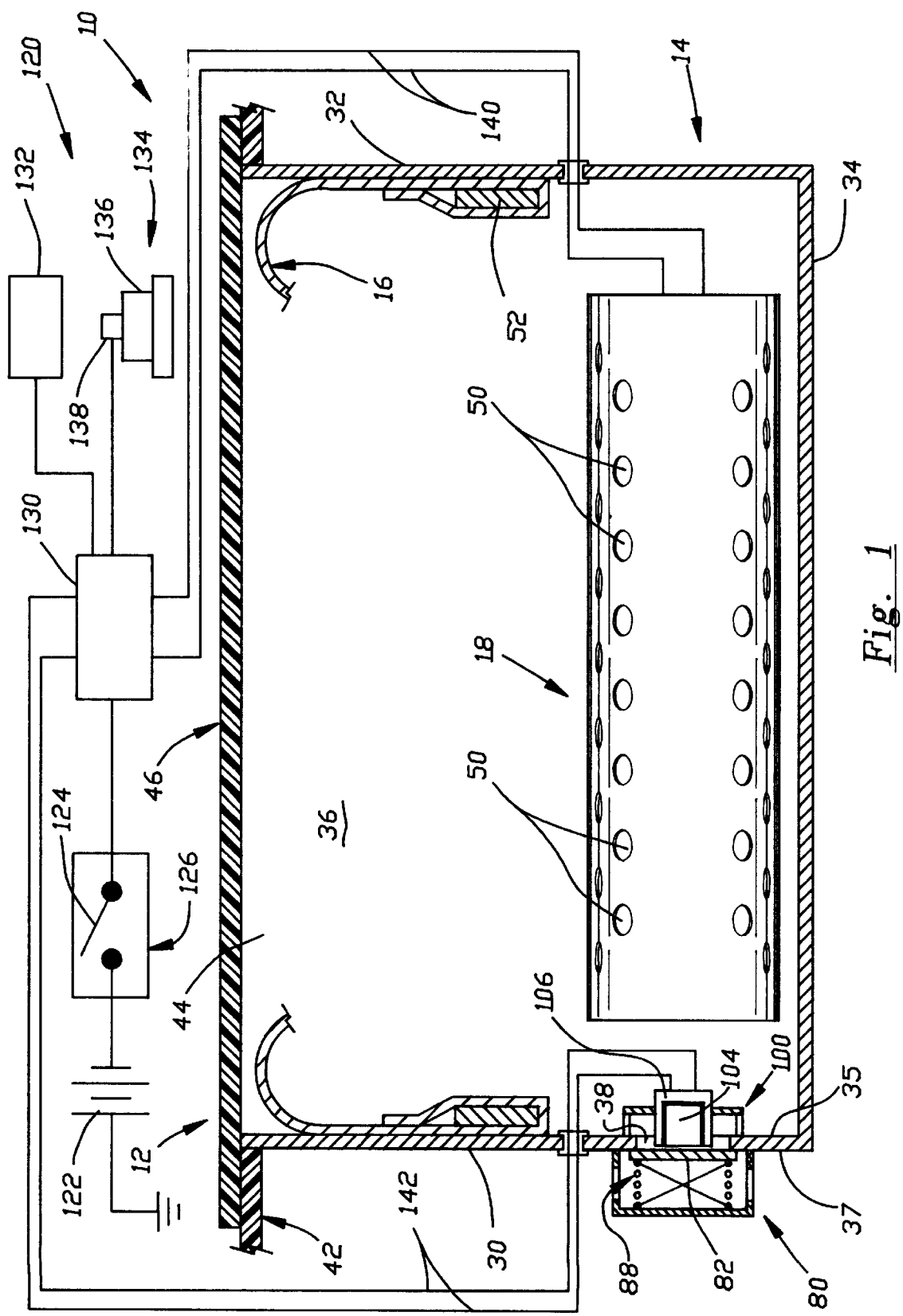
FIG. 1 is a schematic illustration, partially in section, of a vehicle occupant safety apparatus constructed in accordance with the present invention.

As representative of the present invention, FIG. 1 illustrates a vehicle occupant protection apparatus 10 that is constructed in accordance with the present invention. The apparatus 10 includes an inflatable vehicle occupant protection device 16 of the type commonly known as an air bag. The air bag 16 forms a part of an air bag module indicated generally at 12. The air bag module 12 also includes a housing 14 and an inflator 18.

The housing 14 is a box-like metal structure having a plurality of walls including first and second opposite side walls 30 and 32 and a back wall 34. The side wall 30 has an inner side surface 35 and an opposite outer side surface 37. The air bag 16 is secured to the side walls 30 and 32 of the housing 14 by a retainer or retaining ring 52.

The walls of the housing 14, including the side walls 30 and 32 and the back wall 34, define a chamber 36 in the housing. A vent opening 38 is located in the side wall 30 of the housing 14. A vent assembly 80, described below in detail, enables inflation fluid to flow through the vent opening 38 and out of the chamber 36 in the housing 14, away from the air bag 16.

The housing 14 is mounted in a vehicle instrument panel 42 in a known manner (not shown). The back wall 34 of the housing 14 is oriented toward the front of the vehicle in which the air bag module 12 is mounted. A deployment opening 44 is defined between the side walls 30 and 32 of the housing 14. The deployment opening 44 is oriented generally toward the rear of the vehicle in which the air bag module 12 is mounted, that is, toward an occupant of the vehicle. A deployment door or cover 46, which may form a portion of the vehicle instrument panel 42, closes the deployment opening 44 when the air bag 16 is in the deflated condition. Although the housing 14 is shown as a separate structure, which is mounted in the instrument panel 42, such a housing could alternatively be defined by the structure of the instrument panel, or by another part of the vehicle from which the air bag 16 is to be inflated to help protect the vehicle occupant.

The inflator 18 is mounted in the chamber 36 of the housing 14 in a known manner (not shown). The inflator 18 comprises a source of inflation fluid for inflating the air bag 16. As known in the art, the inflator 18 may contain an ignitable gas-generating material, which, when ignited, rapidly generates a large volume of gas. The inflator 18 may alternatively contain a stored quantity of pressurized inflation fluid, or a combination of pressurized inflation fluid and ignitable material for heating the inflation fluid. The inflator 18 has a plurality of fluid outlet openings 50 through which inflation fluid is directed into the chamber 36 in the housing 14 upon actuation of the inflator.

Figure 2:
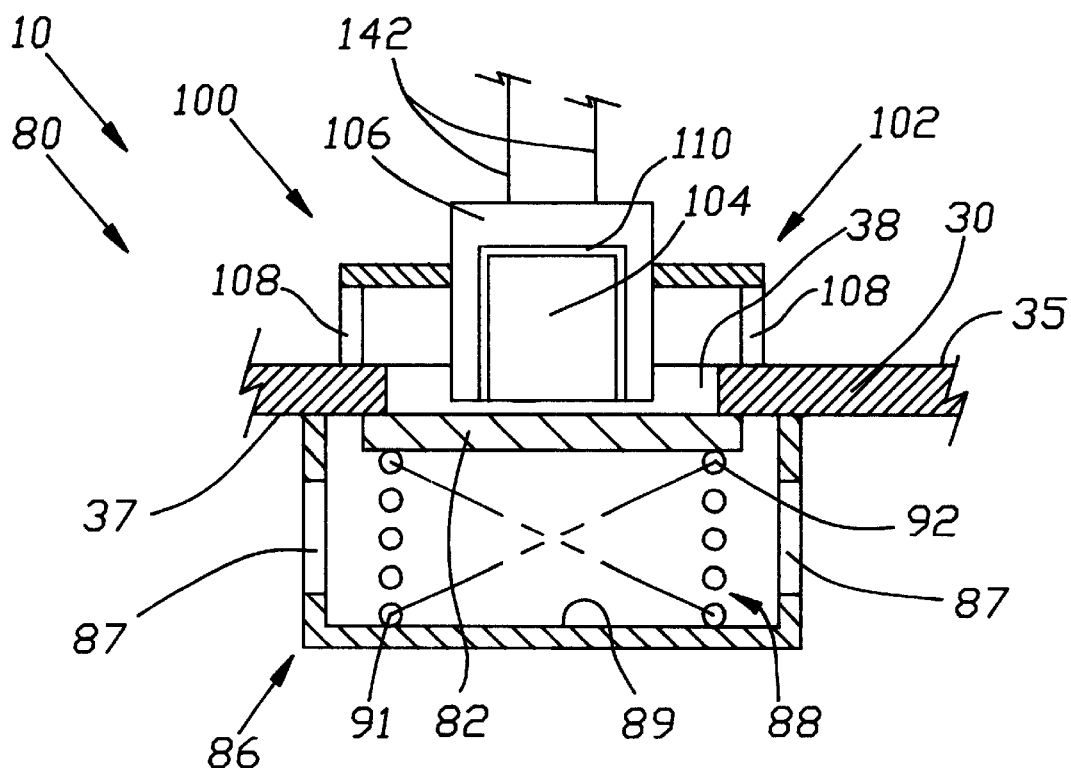
FIG. 2 is a schematic illustration, partially in section, of a portion of the apparatus of FIG. 1.

The vent assembly 80 (FIG. 2) selectively closes or opens the vent opening 38 in the side wall 30. The vent assembly 80 includes a movable member, or door 82, which is movable between a closed condition closing the vent opening 38 and an open condition enabling flow of inflation fluid out of the housing 14 through the vent opening 38. The door 82 is, preferably, constructed at least partially of metal.

The vent assembly 80 also includes a first support cage 86 and a resilient element such as a coil spring 88 for guiding the door 82 between the closed condition and the open condition. The first support cage 86 is fixedly connected to the outer side surface 37 of the side wall 30 and extends around the perimeter of the vent opening 38 and the door 82. The first support cage 86 has a plurality of fluid outlets 87 for directing inflation fluid away from the housing 14 when the door 82 is in the open condition.

The spring 88 is located within the first support cage 86. The spring 88 may be connected between the first support cage 86 and the door 82 in any suitable manner, such as welding. The spring 88 has a first end portion 91 for engaging an interior surface 89 of the first support cage 86 and a second end portion 92 for engaging the door 82. The spring 88 biases the door 82 against the exterior surface 37 of the side wall 30.

The vent assembly 80 further includes an energizable means 100. The energizable means 100 includes a second support cage 102, a permanent magnet 104, and an electromagnet 106. The second support cage 102 is fixedly connected to the interior surface 35 of the side wall 30 and extends around the perimeter of the vent opening 38. The second support cage 102 has a plurality of fluid inlets 108 for directing inflation fluid from the chamber 36 through the vent opening 38 when the door 82 is in the open condition.

The second support cage 102 fixedly supports the permanent magnet 104 and the electromagnet 106 within the chamber 36 of the housing 14. As viewed in FIG. 2, the electromagnet 106 may be U-shaped with the permanent magnet 104 located within an opening 110 formed in the U-shaped electromagnet. Other configurations of the permanent magnet and the electromagnet may also be used to perform the function of the energizable means 100.

The permanent magnet 104 produces a magnetic field that acts on the door 82 and that tends to retain the door in the closed condition, across the vent opening 38, against the exterior surface 37 of the side wall 30 of the housing 14. The electromagnet 106 is energizable, as described below, to produce a magnetic field that acts in opposition to the magnetic field produced by the permanent magnet 104 and neutralizes, or overrides, the magnetic field produced by the permanent magnet.

The vehicle safety apparatus 10 also includes vehicle electric circuitry indicated schematically at 120 (FIG. 1). The vehicle electric circuitry 120 controls the operation of the inflator 18 and the vent assembly 80. The vehicle electric circuitry 120 includes a power source 122, which is preferably the vehicle battery and/or a capacitor, and a normally open switch 124. The switch 124 is part of a collision sensor 126, which senses a condition indicating the occurrence of a vehicle collision. The collision-indicating condition may comprise, for example, sudden vehicle deceleration caused by a collision.

The vehicle electric circuitry 120 further includes a control module 130 for controlling the operation of the vehicle electric circuitry 120, an occupant position sensor 132, and circuitry associated with a seat belt system 134. The position sensor 132 generates a control signal indicative of the position of a vehicle occupant in the interior of a vehicle. The seat belt system 134 helps protect the vehicle occupant by controlling the position of the vehicle occupant. The seat belt system 134 includes a buckle assembly 136 and a means, such as a buckle switch 138, for generating a control signal indicative of a buckled or unbuckled condition of the buckle assembly.

If a collision-indicating condition sensed by the collision sensor 126 is above a predetermined threshold, it indicates the occurrence of a collision for which inflation of the air bag 16 is desired to help protect the occupant of the vehicle. The switch 124 in the collision sensor 126 closes and the control module 130 transmits an actuation signal to the inflator 18 over lead wires 140. When the inflator 18 is actuated, it emits a large volume of inflation fluid into the chamber 36 in the housing 14. The housing 14 directs the inflation fluid from the inflator 18 into the air bag 16 to inflate the air bag.

As the inflation fluid begins to inflate the air bag 16, the air bag moves rapidly and forcefully outward against the deployment door 46. The inflating air bag 16 moves the deployment door 46 outward and the air bag inflates through the deployment opening 44 into a position to help protect the vehicle occupant.

Upon such an occurrence of a condition requiring actuation of the inflator 18, the control module 130 receives the control signals from the position sensor 132 and from the buckle switch 138 to determine whether it is desirable to actuate the vent assembly 80. This determination, as well as the actuating of the vent assembly 80 itself, can be made prior to actuation of the inflator 18, or at the same time as actuation of the inflator, or after actuation of the inflator.

The control signal from the position sensor 132 may indicate a condition in which the vehicle occupant is positioned at least a predetermined distance from the air bag module 12. The control signal from the buckle switch 138 may indicate a buckled condition of the buckle assembly 136. If the control module 130 receives both of these control signals, the control module determines that the door 82 of the vent assembly 80 should remain in the closed condition. The electromagnet 106 is not actuated by the control module 130. The force generated by the permanent magnet 104 is sufficient to retain the door 82 in the closed condition, covering the vent opening 38. As a result, the air bag 16 inflates with maximum speed and force.

On the other hand, the control signal from the position sensor 132 may indicate a condition in which the vehicle occupant is closer than a predetermined distance to the air bag module 12. Also, the control signal from the buckle switch 138 may indicate an unbuckled condition of the buckle assembly 136. If the control module 130 receives one or both of these signal conditions, the control module determines that the door 82 of the vent assembly 80 should be released to vent inflation fluid from the housing 14.

Figure 3:
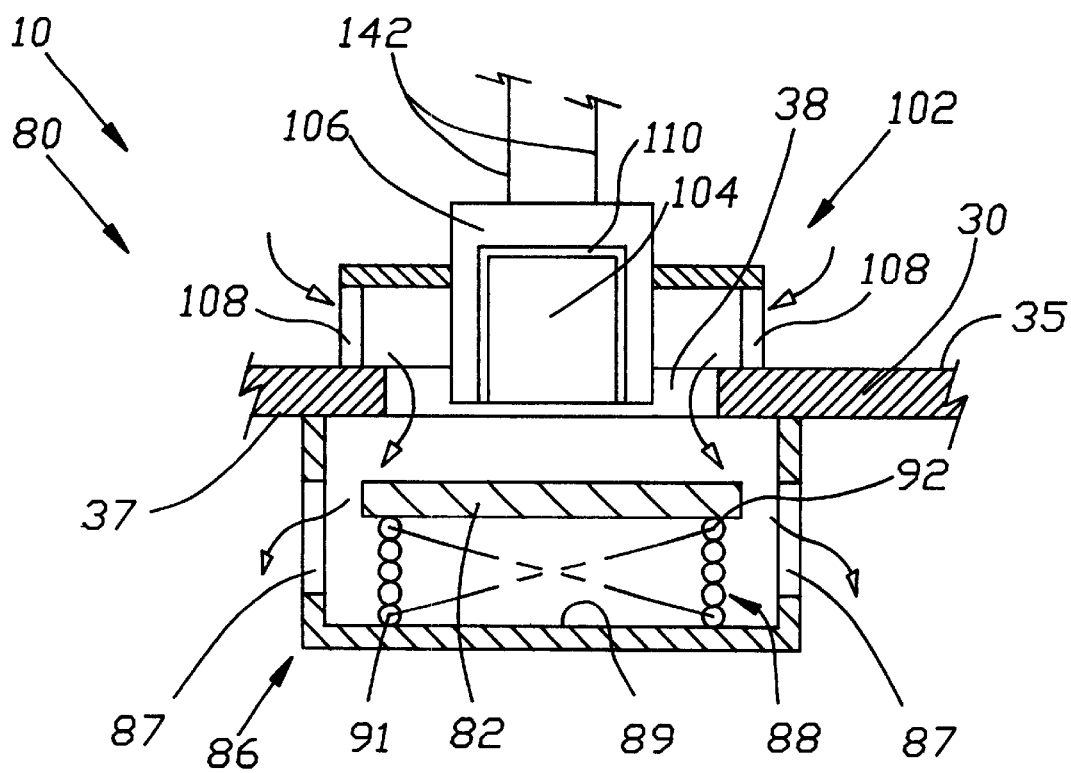
FIG. 3 is a view similar to FIG. 2 showing the apparatus portion of FIG. 2 in a different condition.

In the event that the control module 130 determines that the door 82 should be released, a control signal is transmitted from the control module 130, through lead wires 142, to the electromagnet 106 of the vent assembly 80. The electromagnet 106 is actuated and generates a magnetic field that neutralizes, or overrides, the magnetic field of the permanent magnet 104. The door 82 moves against the bias of the spring 88, due to the pressure of the inflation fluid in the chamber 36, from the closed position shown in FIG. 2 to the open position shown in FIG. 3.

When the door 82 moves from the closed position to the open position, the vent opening 38 in the side wall 30 of the housing 14 is at least partially uncovered. The uncovering of the vent opening 38 enables inflation fluid from the inflator 18 to flow out of the chamber 36 through the inlets 108 of the second support cage 102, the vent opening 38, and the outlets 87 of the first support cage 86. The inflation fluid that flows out of the chamber 36 through the vent opening 38 does not flow into the air bag 16 to inflate the air bag. As a result, the amount of inflation fluid flowing into the air bag 16, or the pressure of the inflation fluid, is reduced as compared to the amount or pressure of inflation fluid flowing into the air bag when the vent opening 38 remains covered by the door 82 in the closed condition. This change in the flow of inflation fluid can help to reduce or control the speed and force of deployment of the air bag 16.

The uncovering of the vent opening 38 is primarily caused by pressure of the inflation fluid in the chamber 36 acting outward upon the door 82 through the vent opening 38. At any time after actuation of the vent assembly 80, if the position sensor 132 and the buckle switch 138 indicate that the vehicle occupant has moved to a proper position and has buckled the buckle assembly 136, the control module 130 may deactivate the electromagnet 106. Deactivating the electromagnet 106 enables the permanent magnet 104 to act on the door 82 to close the vent opening 38 against any remaining fluid pressure in the chamber 36.

It should be understood that the position sensor 132 and the buckle switch 138, which determine actuation of the vent assembly 80, may be augmented by other sensors. For example, a vehicle condition sensor might sense the presence of a rearward-facing child seat, and the control module 130 could then determine that all, or substantially all, of the inflation fluid from the inflator should be vented from the housing 14 rather than directed into the air bag 16.

Furthermore, it should be understood that the control module 130 can determine not only whether, but also when, inflation fluid from the inflator 18 should be vented from the housing 14. For example, it may be desirable to release and/or close the door 82 of the vent assembly 80 at any time either before or after the time of actuation of the inflator 18. Electronic control modules that are capable of controlling the time of actuation of the vent assembly 80, as well as the actuation itself, in response to the signals from the sensors, are known.

From the above description of the invention, those skilled in the art will perceive improvements, changes and modifications in the invention. Such improvements, changes and modifications within the skill of the art are intended to be covered by the appended claims.

Having described the invention, we claim:

1. A vehicle occupant protection apparatus comprising:

an inflatable vehicle occupant protection device having a deflated condition and an inflated condition for helping to protect the vehicle occupant;

an inflation fluid source actuatable to provide inflation fluid to inflate said inflatable device;

a housing for directing inflation fluid under pressure from said inflation fluid source toward said inflatable device upon actuation of said inflation fluid source;

said housing having an opening for enabling flow of inflation fluid out of said housing and away from said inflatable device;

a door movable between a closed condition closing said opening and an open condition enabling flow of inflation fluid out of said housing through said opening; and energizable means for retaining said door in the closed condition and for, when energized, enabling movement of said door from the closed condition to the open condition in response to fluid pressure in said housing, said energizable means comprising an electromagnet;

wherein said energizable means further comprises a permanent magnet which acts on said door to retain said door in the closed condition, said electromagnet when energized acting in opposition to said permanent magnet to enable movement of said door from the closed condition to the open condition in response to the fluid pressure in said housing.

2. An apparatus as set forth in claim 1 further including a resilient element for biasing said door into the closed condition.

3. A vehicle occupant protection apparatus comprising:

an inflatable vehicle occupant protection device having a deflated condition and an inflated condition for helping to protect the vehicle occupant;

an inflation fluid source actuatable to provide inflation fluid to inflate said inflatable device;

a housing for directing inflation fluid under pressure from said inflation fluid source toward said inflatable device upon actuation of said inflation fluid source;

said housing having an opening for enabling flow of inflation fluid out of said housing and away from said inflatable device;

a door movable between a closed condition closing said opening and an open condition enabling flow of inflation fluid out of said housing through said opening; and energizable means for retaining said door in the closed condition and for, when energized, enabling movement of said door from the closed condition to the open condition in response to fluid pressure in said housing, said energizable means comprising an electromagnet;

wherein said energizable means acts to return said door to the closed condition and retain said door in the closed condition after being deenergized.

4. A vehicle occupant protection apparatus comprising:

an inflatable vehicle occupant protection device having a deflated condition and an inflated condition for helping to protect the vehicle occupant;

an inflation fluid source actuatable to provide inflation fluid to inflate said inflatable device;

a housing for directing inflation fluid under pressure from said inflation fluid source toward said inflatable device upon actuation of said inflation fluid source;

said housing having an opening for enabling flow of inflation fluid out of said housing and away from said inflatable device;

a door movable between a closed condition closing said opening and an open condition enabling flow of inflation fluid out of said housing through said opening;

energizable means for retaining said door in the closed condition and for, when energized, enabling movement of said door from the closed condition to the open condition in response to fluid pressure in said housing, said energizable means comprising an electromagnet;

a first support cage for connecting said energizable means to said housing; and a second support cage for guiding said door between the open condition and the closed condition.

5. An apparatus as set forth in claim 4 wherein said second support cage has a plurality of openings for enabling flow of inflation fluid out of said housing.

6. A vehicle occupant protection apparatus comprising:

an inflatable vehicle occupant protection device having a deflated condition and an inflated condition for helping to protect the vehicle occupant;

an inflation fluid source actuatable to provide inflation fluid to inflate said inflatable device;

a housing for directing inflation fluid under pressure from said inflation fluid source toward said inflatable device upon actuation of said inflation fluid source;

said housing having an opening for enabling flow of inflation fluid out of said housing and away from said inflatable device;

a door movable between a closed condition closing said opening and an open condition enabling flow of inflation fluid out of said housing through said opening; and energizable means for retaining said door in the closed condition and for, when energized, enabling movement of said door from the closed condition to the open condition in response to fluid pressure in said housing, said energizable means comprising an electromagnet;

wherein said energizable means further comprises a permanent magnet which acts to retain said door in the closed condition.

7. A vehicle occupant protection apparatus comprising:

an inflatable vehicle occupant protection device having a deflated condition and an inflated condition for helping to protect a vehicle occupant;

an inflation fluid source actuatable to provide inflation fluid to inflate said inflatable device;

a housing for directing inflation fluid from said inflation fluid source toward said inflatable device upon actuation of said inflation fluid source, said housing having an opening for enabling flow of inflation fluid out of said housing and away from said inflatable device;

a door movable between a closed condition closing said opening and an open condition enabling flow of inflation fluid out of said housing through said opening;

a seat belt system for helping to protect the vehicle occupant, said seat belt system including a buckle assembly;

means for generating a control signal indicative of a buckled or unbuckled condition of said buckle assembly; and energizable means responsive to said control signal for retaining said door in the closed condition and for, when energized, enabling movement of said door from the closed condition to the open condition;

wherein said energizable means comprises an electromagnet and a permanent magnet which acts to retain said door in the closed condition.

8. A vehicle occupant protection apparatus comprising:

an inflatable vehicle occupant protection device having a deflated condition and an inflated condition for helping to protect the vehicle occupant;

an inflation fluid source actuatable to provide inflation fluid to inflate said inflatable device;

a housing for directing inflation fluid under pressure from said inflation fluid source toward said inflatable device upon actuation of said inflation fluid source;

said housing having an opening for enabling flow of inflation fluid out of said housing and away from said inflatable device;

a door movable between a closed condition closing said opening and an open condition enabling flow of inflation fluid out of said housing through said opening; and energizable means for controlling movement of said door between the open condition and the closed condition, said energizable means comprising an electromagnet;

wherein said energizable means comprises a permanent magnet which acts to retain said door in the closed condition.

* * * * *